May 18, 1965 H. J. M. JOORMANN ETAL 3,184,631

ELECTROLUMINESCENT ELEMENT WITH A NICKEL-IRON BASE

Filed Feb. 1, 1961

INVENTOR
Hendrik J.M. Joormann.
GESINUS DIEMER
HENDRIK A. KLASENS
BY
Frank R. Trifari
AGENT 3,184,631

ELECTROLUMINESCENT ELEMENT WITH A NICKEL-IRON BASE

Hendrik Jacobus Maria Joormann, Gesinus Diemer, and Hendrik Anne Klasens, all of Emmasingel, Eindhoven, Netherlands, assignors to North American Philips Company, Inc., New York, N.Y., a corporation of Delaware Filed Feb. 1, 1961, Ser. No. 86,484
Claims priority, application Netherlands, Feb. 4, 1960, 248,068
11 Claims. (Cl. 313—108)

Figure 1:
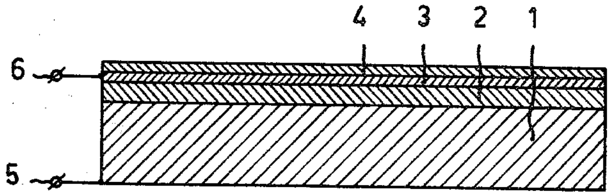

This invention relates ot electroluminescent elements comprising a metal carrier and a glass-enamel layer in which the electroluminescent material is embedded and which is covered with a conductive layer on each side, the conductive layer on the side remote from the carrier being permeable to the radiation emitted by the electroluminescent layer upon applying a voltage between the two conductive layers. The conductive layer adjacent the carrier and the carrier may be united. The term "conductive layer" is to be understood herein to mean an electrode galvanically led to the exterior and provided with a terminal.

It is known to use metal plates of iron, copper and nickel-plated or copper-plated iron as substrata for electroluminescent elements in which the electroluminescent material is embedded in glass enamel. The use of plates of pure iron or pure copper on which the electroluminescent layer is provided directly affords the advantage of a cheap carrier material. However, disadvantages then involved are the poor adhesion to iron or copper of glass enamels which are readily fusible and endured by zinc sulphides, the poor light output of the element and the low breakdown voltage. It has been found that nickel-plating and copper-plating of iron is not sufficient to meet these disadvantages. The drawbacks may be suppressed in part by using a heavily-enamelled iron carrier, but this gives rise to a structure which is more expensive and more complicated. An element according to the invention provides a solution in which these disadvantages are avoided.

According to the invention, the metal carrier consists of nickel-iron having a composition of from 50% to 80% of nickel and from 50% to 20% of iron. The coefficient of expansion of this nickel-iron is such that a favourable pigmented glass-enamel layer having electroluminescent properties can be manufactured which, as regards its coefficient of expansion, is properly matched to that of the nickel-iron so that after adhesion of the glass enamel to the nickel-iron no heavy mechanical stress occurs in the electroluminescent layer, which would result in a poor light output, possible due to fissures which reduce the breakdown voltage of the electroluminescent layer. An element according to the invention can resist a high breakdown voltage, even in cases where the metal carrier has not first been enamelled. Particularly good results are obtained with an alloy consisting of 75% of nickel and 25% of iron, that is to say an alloy which is known in engineering as: mμ metal.

Since for a given operating voltage, for example the mains voltage, the light output decreases upon increasing thickness of the glass-enamel layer, this thickness is not chosen greater than necessary and is preferably from 20 to 80 microns. More particularly the glass-enamel layer is built up of a partial layer adjacent the metal carrier and containing titanium-dioxide pigment and a partial layer remote from the metal carrier and containing the electroluminescent material. Such a structure affords the advantage that the light output is higher than that of a device having a glass-enamel layer which has the same thickness, but which contains electroluminescent material only. In addition, there is a smaller possibility of the electroluminescent material being chemically attacked by the metal carrier, whilst the light emitted by the electroluminescent material is reflected by the partial layer containing the titanium-dioxide pigment. In contrast to known analogous layers which contain organic binders instead of glass enamel, the resistivity to breakdown in the structure according to the invention has been found to be the same in either case. Preference is given to a partial layer containing titanium-dioxide pigment which has a thickness of from 5 to 50 microns and a content of titanium-dioxide pigment of from 5% to 20% by volume. The partial layer containing electroluminescent material is preferably from 15 to 50 microns thick and has a content of electroluminescent material of from 20% to 50% by volume.

As regards the glass enamel in which the electroluminescent material is embedded, those enamels are preferred which are little reactive with respect to the nickel-iron carrier, since otherwise due to the diffusion of nickel through the glass enamel the light output would decline as a result of the disadvantageous influence of nickel upon an electroluminescent material. Such attack takes place if the enamel contains many acid oxides relative to sodium and hence in the case of acid enamels. Consequently, for nickel-iron carriers use is preferably made of glass enamels having a low acidity. The degree of acidity of a glass may be determined, for example, in the following manner. A glass powder (so-called frit) is manufactured by pouring molten enamel into water whereby it is burst into many pieces. The acidity of the water is then a measure of that of the glass enamel. A glass enamel of a low acidity has, for example, a composition of

| | |
|---|---|
| 17.5 mol. percent of | $Na_2O$ |
| 5.0 mol. percent of | $K_2O$ |
| 5.5 mol. percent of | CaO |
| 3.0 mol. percent of | SrO |
| 3.0 mol. percent of | BaO |
| 7.0 mol. percent of | ZnO |
| 10.5 mol. percent of | $SiO_2$ |
| 37.5 mol. percent of | $B_2O_3$ |
| 11.0 mol. percent of | $Al_2O_3$ |

Figure 2:
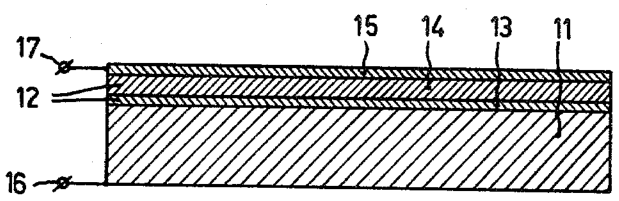

In order that the invention may be readily carried into effect, it will now be described in detail, by way of example, with reference to the accompanying diagrammatic drawing, in which FIGURES 1 and 2 are sectional views of electroluminescent elements in which the mutual thicknesses of the layers are not shown to scale.

FIGURE 1 shows a cross-section of an electroluminescent element according to the invention comprising a nickel-iron carrier 1 on which is provided a layer 2 of electroluminescent zinc-sulphide embedded in glass enamel, which has been activated, for example, with copper, silver, gold or manganese and co-activated with aluminium or chlorine. On the side remote from the carrier 1, the layer 2 is covered with a conductive transparent layer 3 of tin-oxide, which is covered for protection with a glass layer 4. The carrier 1 and the conductive transparent layer 3 are provided with terminals 5 and 6 respectively.

FIGURE 2 also shows a cross-section of an electroluminescent element according to the invention comprising a nickel-iron carrier 11 on which is provided a glass enamel layer 12 which is built up of two partial layers, that is to say a partial layer 13 adjacent the carrier and containing titanium-dioxide pigment and a partial layer 14 remote from the carrier and containing electroluminescent zinc-sulphide. The layer 12 is covered with a conductive transparent layer 15 of tin-oxide. The carrier 11 and the conductive transparent layer 15 are provided with terminals 16 and 17 respectively.

In a certain structure of an element as shown in FIGURE 2, the nickel-iron carrier 11 has a thickness of 0.2 mm. and a composition of 75% of nickel and 25% of iron. The partial layer 13 has a thickness of 15 microns and a content of titanium-dioxide pigment is 10% by volume. The partial layer 14, which contain 30% by volume of activated zinc-sulphide, has a thickness of 25 microns.

What is claimed is:

1. An electroluminescent element comprising a metal carrier and a glass-enamel layer in which the electroluminescent material is embedded and which is covered with a conductive layer on each side, the conductive layer on the side remote from the carrier being permeable to radiation emitted by the electroluminescent layer upon applying a voltage between the two conductive layers, wherein the metal carrier consists of nickel-iron having a composition of from 50% to 80% of nickel and from 50% to 20% of iron.

2. An electroluminescent element of claim 1, wherein the metal carrier is at the same time a conductive layer.

3. An electroluminescent element of claim 2, wherein the metal carrier consists of 75% of nickel and 25% of iron.

4. An electroluminescent element of claim 3, wherein the glass-enamel layer has a thickness of from 20 to 80 microns.

5. An electroluminescent element of claim 4, wherein the glass-enamel layer is built up of a partial layer adjacent the metal carrier and containing titanium-dioxide pigment and a partial layer remote from the metal carrier and containing electroluminescent material.

6. An electroluminescent element of claim 5, wherein the partial layer containing titanium-dioxide pigment has a thickness of from 5 to 50 microns.

7. An electroluminescent element of claim 6, wherein the content of titanium-dioxide pigment in the partial layer containing titanium-dioxide pigment is from 5% to 20% by volume.

8. An electroluminescent element of claim 7, wherein the partial layer containing electroluminescent material has a thickness of from 15 to 50 microns.

9. An electroluminescent element of claim 8, wherein the content of electroluminescent material in the relevant partial layer is from 20% to 50% by volume.

10. An electroluminescent element of claim 9, wherein the glass enamel has a low acidity.

11. An electroluminescent element of claim 10, wherein the glass enamel has a composition of

| | |
|---|---|
| 17.5 mol. percent of | $Na_2O$ |
| 5.0 mol. percent of | $K_2O$ |
| 5.5 mol. percent of | CaO |
| 3.0 mol. percent of | SrO |
| 3.0 mol. percent of | BaO |
| 7.0 mol. percent of | ZnO |
| 10.5 mol. percent of | $SiO_2$ |
| 37.5 mol. percent of | $B_2O_3$ |
| 11.0 mol. percent of | $Al_2O_3$ |

References Cited by the Examiner

UNITED STATES PATENTS

| | | | |
|---|---|---|---|
| 2,774,737 | 12/56 | Mager | 313—108.1 |
| 2,857,541 | 10/58 | Etzel et al. | 313—108.1 |
| 2,866,117 | 12/58 | Walker et al. | 313—108.1 |
| 2,911,553 | 11/59 | Joormann et al. | 313—108.1 |

FOREIGN PATENTS

| | | |
|---|---|---|
| 733,260 | 7/50 | Great Britain. |

OTHER REFERENCES

"Materials Technology for Electron Tubes" by Walter H. Kahl, Reinhold Publishing Co., 330 W. 42d St., New York, N.Y., page 71.

GEORGE N. WESTBY, *Primary Examiner.*

RALPH G. NILSON, *Examiner.*